(12) United States Patent
Kennedy et al.

(10) Patent No.: US 8,305,196 B2
(45) Date of Patent: Nov. 6, 2012

(54) METHOD AND APPARATUS FOR RESPONDER ACCOUNTING

(75) Inventors: Neil T. Kennedy, Chesapeake Beach, MD (US); William J. Jhoslien, Coral Springs, FL (US); Robert L. Sapashe, Boca Raton, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 729 days.

(21) Appl. No.: 12/240,137

(22) Filed: Sep. 29, 2008

(65) Prior Publication Data

US 2010/0079255 A1 Apr. 1, 2010

(51) Int. Cl.
G06Q 10/00 (2012.01)
G08B 25/00 (2006.01)
H04B 7/00 (2006.01)
H04W 72/00 (2009.01)

(52) U.S. Cl. ............ 340/10.4; 340/5.61; 340/6.11; 340/10.5; 235/382; 455/440; 705/7.15

(58) Field of Classification Search ............ 705/5, 7.15; 235/375–377, 380, 382, 382.5, 385; 340/5.2–5.21, 340/5.6–5.67, 5.8–5.81, 5.92, 539.11, 539.13, 340/539.1, 539.2, 539.18, 572.1, 572.4, 572.8, 340/572.9; 455/440
See application file for complete search history.

(56) References Cited

U.S. PATENT DOCUMENTS

| | | | |
|---|---|---|---|
| 6,029,889 A * | 2/2000 | Whalen et al. | 235/380 |
| 6,824,065 B2 * | 11/2004 | Boone et al. | 235/492 |
| 6,853,303 B2 | 2/2005 | Chen et al. | |
| 6,873,260 B2 * | 3/2005 | Lancos et al. | 340/573.1 |
| 7,034,678 B2 | 4/2006 | Burkley et al. | |
| 7,091,852 B2 | 8/2006 | Mason et al. | |
| 7,191,934 B2 | 3/2007 | Miller et al. | |
| 7,215,976 B2 | 5/2007 | Brideglall | |
| 7,245,216 B2 | 7/2007 | Burkley et al. | |
| 7,598,854 B2 * | 10/2009 | Wong | 340/539.13 |
| 7,633,387 B2 * | 12/2009 | Carmichael et al. | 340/539.13 |
| 7,652,571 B2 * | 1/2010 | Parkulo et al. | 340/540 |

(Continued)

FOREIGN PATENT DOCUMENTS

JP 7056991 A 3/1995

(Continued)

OTHER PUBLICATIONS

International Search Report and Written Opinion mailed on Apr. 1, 2010 for International Application No. PCT/US2009/054717.

(Continued)

*Primary Examiner* — Benjamin C Lee
*Assistant Examiner* — Stephen Burgdorf
(74) *Attorney, Agent, or Firm* — Barbara R. Doutre; James Lamb

(57) ABSTRACT

A method and apparatus for accounting for responders at a site, includes obtaining a first RFID from a scanning of a responder radio performed in a vicinity of the site; determining, by using the first RFID, a responder identity from a RFID database that associates each one of a plurality of responder identities to a corresponding responder radio RFID; adding at least one of the responder identity and the first RFID to an active responder database for the site; initiating an acknowledgement to the responder radio; obtaining a second RFID as a result of a second scanning; and removing the responder identity from the active responder database when the second RFID matches the first RFID.

18 Claims, 5 Drawing Sheets

U.S. PATENT DOCUMENTS

| | | | |
|---|---|---|---|
| 2002/0024507 A1* | 2/2002 | Boone et al. | 345/173 |
| 2002/0090913 A1* | 7/2002 | Ritter | 455/41 |
| 2003/0027553 A1* | 2/2003 | Davidson et al. | 455/412 |
| 2004/0174269 A1 | 9/2004 | Miller et al. | |
| 2005/0164684 A1* | 7/2005 | Chen et al. | 455/414.1 |
| 2005/0248454 A1* | 11/2005 | Hanson et al. | 340/539.26 |
| 2005/0270158 A1* | 12/2005 | Corbett, Jr. | 340/572.1 |
| 2006/0111053 A1* | 5/2006 | Wu et al. | 455/90.3 |
| 2006/0132300 A1* | 6/2006 | Howe et al. | 340/539.13 |
| 2007/0032224 A1* | 2/2007 | Boyer et al. | 455/417 |
| 2007/0197261 A1* | 8/2007 | Humbel | 455/558 |
| 2007/0273514 A1* | 11/2007 | Winand et al. | 340/572.1 |
| 2008/0180301 A1* | 7/2008 | Aaron | 341/176 |
| 2008/0186166 A1* | 8/2008 | Zhou et al. | 340/539.13 |
| 2008/0200166 A1* | 8/2008 | McCamon | 455/426.1 |
| 2009/0153333 A1* | 6/2009 | Zhang et al. | 340/572.4 |
| 2010/0052867 A1* | 3/2010 | Kwok et al. | 340/10.42 |
| 2010/0073188 A1* | 3/2010 | Mickle et al. | 340/825.49 |

FOREIGN PATENT DOCUMENTS

| | | |
|---|---|---|
| JP | 2007226379 A | 9/2007 |
| JP | 2008070967 A | 3/2008 |
| KR | 1020070091876 A | 9/2007 |

OTHER PUBLICATIONS

International Preliminary Report on Patentability mailed on Apr. 7, 2011 for International Application No. PCT/US2009/054717.

* cited by examiner

600

605

SEND A COMMAND TO THE RESPONDER RADIO THAT AUTOMATICALLY CHANNEL STEERS THE RADIO TO A CHANNEL THAT IS ASSOCIATED WITH THE SUB - SITE LOCATION WHEN THE THIRD RFID MATCHES THE FIRST RFID

*FIG. 6*

METHOD AND APPARATUS FOR RESPONDER ACCOUNTING

FIELD OF THE DISCLOSURE

The present disclosure relates generally to radio communication systems and more particularly to temporary on-site radio communication systems that are temporarily established, as for emergency situations.

BACKGROUND

Emergency situations arise in which responders (e.g., fire department personnel, police department personnel, disease control personnel) from one or more safety agencies are brought to a site of the emergency situation. For some emergency situations, the leadership of the responders attempts to keep track of the personnel so that they can be sure that all personnel have been accounted for and have left the site safely. One current system for keeping track of such safety personnel is manual (using Velcro backed tags that identify the responders) and may rely on the heavily stressed safety personnel, which leads to errors in which a person is either identified as having left the site without actually having done so, or as not having left the site when actually already having left. Either situation is bad. Another existing system is a computer based, but it relies on identification of radio power on and off states. These states are not always synonymous with entering and leaving a state of active involvement with the emergency situation, and some errors can arise.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 is a flow chart that shows some steps of a method of channel steering, in accordance with certain embodiments Skilled artisans will appreciate that elements in the FIGS. are illustrated for simplicity and clarity and have not necessarily been drawn to scale. For example, the dimensions of some of the elements in the figures may be exaggerated relative to other elements to help to improve understanding of embodiments of the present invention.

Figure 1:
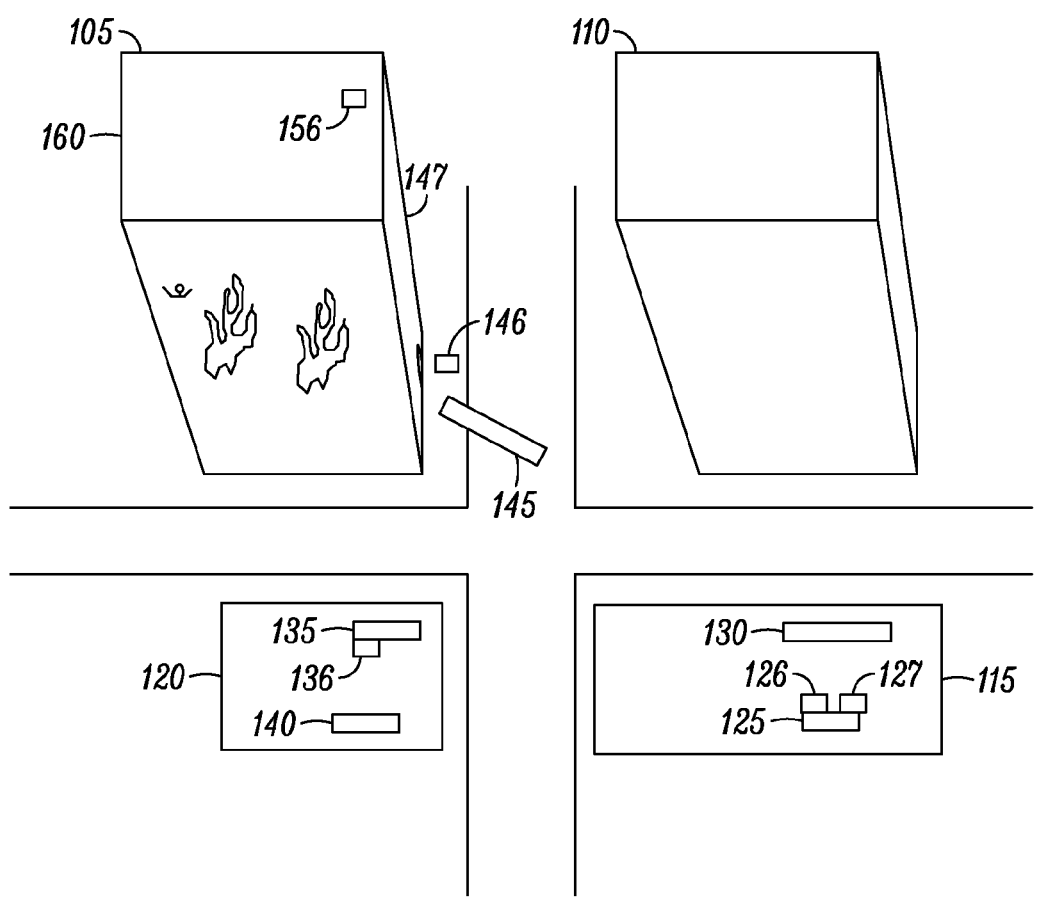
FIG. 1 is an overhead perspective drawing that shows an emergency site at which fire department responders have arrived, in accordance with certain embodiments

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to FIG. 1, an overhead perspective drawing shows an emergency site 100 at which fire department responders have arrived, in accordance with certain embodiments. At the site are located two buildings 105, 110, of which building 105 is on fire. Building 105 has a roof 160 on which emergency helicopters may land. The site also includes two parking areas. A first parking area 115 has been designated as an assembly area for the public safety agencies on the scene. A second parking area 120 has been designated as a triage area for injured civilians or public safety personnel. A command vehicle 125 and a large fire truck 130 are parked in the assembly area 115. A computer 127 is set up in or near the command vehicle 125, and a first RFID reader 126 is set up near the command vehicle 125. Two ambulances 135, 140 are parked in the triage area 120. A second RFID reader 136 is set up near ambulance 135. A fire truck 145 is parked near an entrance 147 of the building 105 that is on fire. The entrance has been designated for entry into the building by the fire fighters. A third RFID reader 146 is set up near the entrance 147. A fourth RFID reader 156 is set up on the roof 160. The particular situation described with reference to FIG. 1 is just one example of an emergency site that is set up in accordance with some of the embodiments. In some embodiments, the site 100 includes four sub-sites, which are the assembly area 115, the triage area 120, the roof 160, and the entrance 147. In other embodiments, the first RFID reader 126 is associated with the entire site 100, and there are three sub-sites: the triage area 120, the roof 160, and the entrance 147

In accordance with some embodiments, certain public safety personnel carry portable radios that are conventional in most aspects, but are equipped with a radio frequency identification device (RFID). In some embodiments, the public safety personnel carrying such radios may only be fire department fire fighting personnel, while in other embodiments, all public safety personnel who may respond to emergencies may have such radios. These people may be referred to as responders. Generally speaking, the embodiments uniquely allow leaders to account for responders who are likely to enter dangerous areas, using conventional radios carried by the responders, which are altered only by the addition of the RFID label. As described further below, this allows for a valuable facility at little cost that substantially reduces the failure probability from that of a conventional manual accounting system.

In certain embodiments described with reference to FIG. 1, all responders who are directed to enter the site 100 have an RFID equipped radio and go to the RFID reader 126, which is the only RFID reader deployed, where they have their radio scanned for an RFID. The scanned RFID is sent to the computer 127, wherein the RFID is looked up in a table. An identity of the responder is automatically determined from the table and entered into a list, or database, of active responders at the site 100 and an acknowledgement is sent to the responder's radio indicating that the identity of the responder has been entered into the database of active responders. When the same responder leaves the site 100, the responder goes to the RFID reader 126 where the responder has the radio scanned for the RFID. The scanned RFID is sent to the computer 127. When the RFID is received, the responder is removed from the database of responders active at site 100. In some embodiments, the RFID readers 136, 146, 156 are also deployed and the responder may go to one of the RFID readers 136, 146, 156 to have their radio scanned for an RFID, indicating a sub-site that they are entering or leaving. Optional enhancements and more details are described below.

Figure 2:
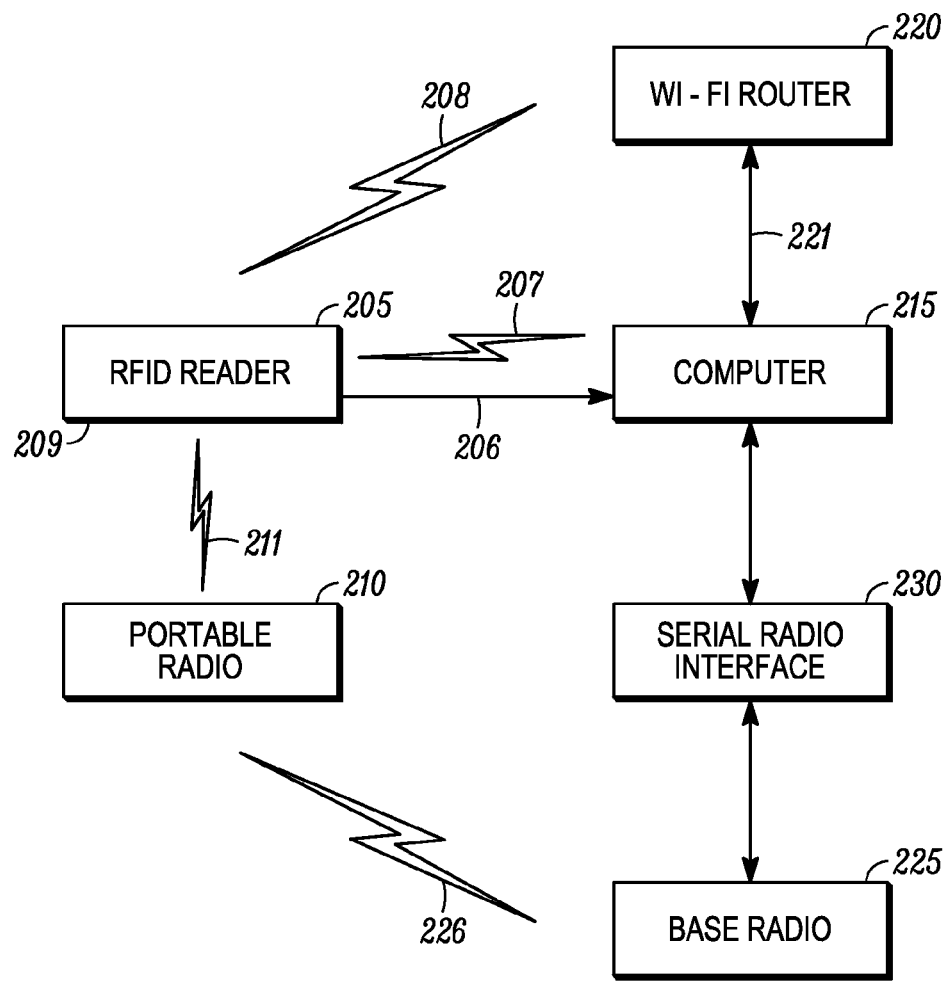
FIG. 2 is a block diagram that shows a responder accounting system that includes one responder radio, in accordance with certain embodiments.

Referring to FIG. 2, a block diagram shows a responder accounting system 200 that includes one responder radio 210, as well as others that are not shown in FIG. 2, in accordance with certain embodiments. In addition to the responder radio 210, the responder accounting system 200 includes an RFID reader 205, a Wi-Fi router 220, a computer 215, a base radio 225, and a serial radio interface 230. In some embodiments, the responder radio 210 is a modified model XTS® 5000 radio manufactured by Motorola, Inc., of Schaumburg, Ill. that communicates using Astro® P25 signaling, and the RFID reader 205 is an RD5000 Mobile RFID reader, also manufactured by Motorola, Inc. The RFID reader 205 and the computer 215 may be a combined apparatus in some embodiments. The modification to the XTS 5000 radio 210 is the addition of an RFID label. In some embodiments, it may be desirable to hide the RFID label, in which case it may be applied to the radio 210 under an escutcheon or label that is otherwise normally applied to the radio 210. The Wi-Fi router 220 may be any conventional WiFi router and the computer 215 may be a conventional computer running under a conventional operating system but having at least one program having unique aspects that are described in more detail below. In some embodiments, the base radio 225 is any radio manufactured that can signal that communicates using Astro® P25 signaling, and the serial radio interface 230 may be a model SRIB serial radio interface manufactured by Motorola, Inc., of Schaumburg, Ill.

During use of the responder accounting system 200, a responder possessing responder radio 210 may take the responder radio 210 near the RFID reader 205, where the RFID of the responder radio 210 can be read by performing an RFID scan. The RFID scan may be accomplished using conventional RFID scanning that involves receiving the RFID at an input 209 of the RFID reader 206. This operation may be done at the command of the responder or a person operating the RFID reader 205, depending on the characteristics of the RFID reader 205 and the training and operational procedures for the responder accounting system 200. The RFID is then communicated to the computer 215. The signaling techniques of three communication methods for communicating the RFID to the computer are illustrated in FIG. 2: Wi-Fi communication via a WiFi RF signaling protocol 208 to Wi-Fi router 220, then by Ethernet 221 to the computer 215; a wireless connection 207, which could be a wide area network connection or a point to point microwave system such as the PTP 45600 microwave system manufactured by Motorola that has a range of up to 124 miles—allowing the computer to be off site—or it could be a short range wireless system such as one that uses the Bluetooth® or IrDA protocol to the computer 215 when the computer 215 is close to the RFID reader 205; or a wired connection 206, such as Serial. (Bluetooth is a registered trademark of the Bluetooth Special Interest Group). In some off site configurations, the computer 215 may be a server or server application in a radio network. When the RFID reader 205 is combined with the computer 215 in one apparatus, the method for communicating the RFID within the apparatus may be a bus connection. In some of the embodiments in which the computer 215 may be linked to more than one RFID reader 205, the computer 215 may make a determination of the identity of the RFID reader 205 in addition to receiving the RFID of the responder radio 210. The determination may be made by an identity received from the RFID reader 205 within the signal received from the RFID reader 205, or by other means, such as an identity of a computer port through which the RFID reader 205 communicates. In some embodiments, the RFID reader may include an indication of whether the RFID is associated with an exit or entry of the responder from the site. The computer 215 then uses the received RFID and other information in a manner described below in more detail to maintain an accountability of the responder associated with the RFID. In some embodiments, the computer 215 may be coupled via a serial radio interface 230 to the base radio 225. The computer may initiate an acknowledgement from the base radio 225 to the responder radio 205 by sending a command that causes the base radio 225 to send a command to the responder radio 210 using a radio signal 226 that changes the channel of the responder radio 210 to a channel assigned for use by the responder associated with the location of the RFID reader 205.

Figure 3:
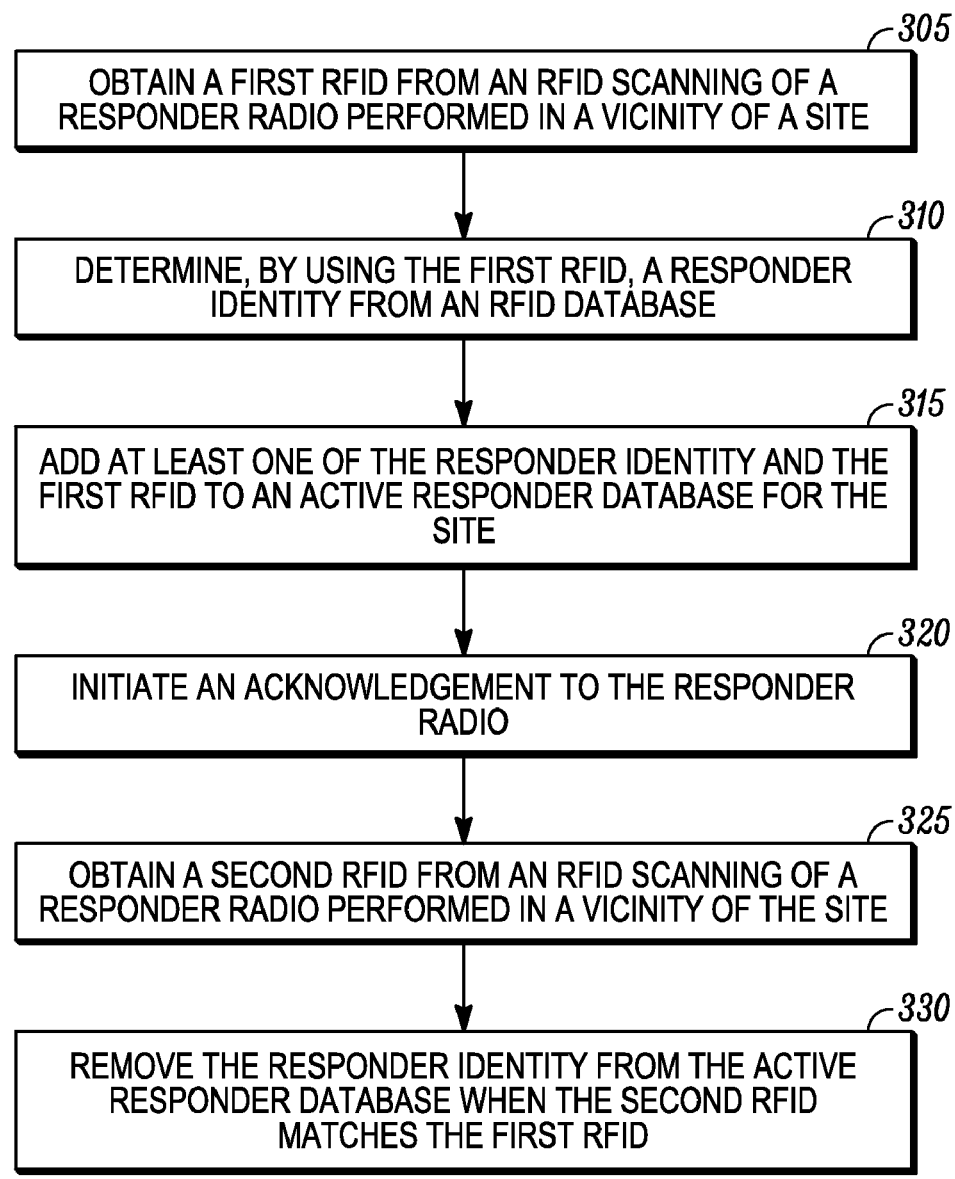
FIG. 3 is a flow chart that shows some steps of a method for accounting for responders.

Referring to FIG. 3, a flow chart shows some steps of a method 300 for accounting for responders. At step 305, a first RFID is obtained by the computer 215. The RFID is one that has resulted from an RFID scanning of a responder radio performed in the vicinity of a site for which responder accountability is to be maintained. When the computer 215 forms a portion of an apparatus that includes the RFID reader 205, the RFID may be considered to be obtained directly as a result of an RFID scanning. When the computer 215 is separate from the RFID reader 205 (either locally or remotely) the RFID may be obtained by being received from the RFID reader 205. When the computer 215 is coupled to only one RFID reader, the location of which is known to be in a vicinity of the site, then no additional information beyond the scanned RFID may be needed to establish that the RFID is one that has resulted from an RFID scanning of a responder radio performed in the vicinity of the site. When the computer is located remotely from the site, then some setup information may be needed to associate an RFID reader with a site, and when more than one RFID reader is sending information to one computer, the RFID reader may need to be identified each time an RFID is being obtained.

In accordance with certain embodiments, this RFID is obtained when a responder who has an RFID equipped communication radio reaches the vicinity of a site for which it is beneficial to maintain a list of those responders who are within the site. In certain embodiments, the site is one within which dangerous conditions exist, which provides incentive to keep an accurate track of those responders who are in a dangerous area or areas. The entire site may be considered to be a dangerous area, or there may exist one or more sub-sites that include a dangerous area. At step 310, the computer determines, by using the first RFID, a responder identity from an RFID database that associates each one of a plurality of responder identities to a corresponding responder radio RFID. It will be appreciated that this RFID database may be distributed among a plurality of computers that are accessible to the computer that obtains the RFID, which may be the case when multiple agencies are involved in an emergency situation. One or both of the responder identity and the first RFID are added to an active responder database for the site at step 315. It will be appreciated that as long as the RFID database remains accessible, it would not be necessary to store both, but it may be desirable to do so for the sake of fast lookup response times. It will be appreciated that after step 315, a user such as a commander can then look at a list of responders that includes the one whose radio's RFID was obtained at step 305. At step 320, the computer initiates an acknowledgement to the responder radio. This may be accomplished by the computer sending a command through a serial radio interface to a base radio that causes a command to be sent using signaling link 226, as described above with reference to FIG. 2, or by other techniques commonly used within a radio network. The acknowledgement may be one that causes the radio to present information to the responder that indicates that the responder has been added to the active responder database. A second RFID is obtained at step 325 from a scanning of a responder radio that is performed in a vicinity of the site. At step 330, the stored item or items relating to the responder identified by the first RFID scan (the RFID and/or the identity of the responder) are removed from the active responder database when the second RFID matches the first RFID. In some embodiments, an acknowledgement is also initiated by the computer when the stored item or items related to the responder are removed from the active responder database.

In some embodiments according to FIG. 3, the active responder database is cleared before any responders are added to it from the site of a new incident, and the action of receiving the RFID from an RFID reader when it is first scanned adds the responder to the active responder database. A next receipt of the same RFID from an RFID reader removes the responder from the active responder database. Yet another receipt of the same RFID would add the responder back into the database, etc. In other words, the active responder database is obtained by performing a toggle algorithm for each radio RFID based on receipts of that RFID. When there is only one RFID reader at a site, and the responder is trained to understand the importance of scanning the radio every time the responder leaves or enters the site, the toggle method provides an effective means of maintaining a list of responders who are active at the site. This method improves the accuracy of identifying active responders in comparison to known systems.

Figure 4:
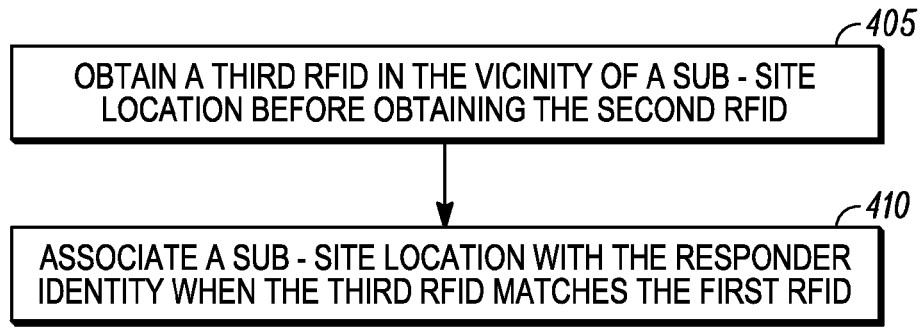
FIG. 4 is a flow chart that shows a method of sub-site identification, in accordance with certain embodiments.

Referring to FIG. 4, a flow chart shows some steps of a method 400 of sub-site identification, in accordance with certain embodiments that are also consistent with the method of FIG. 3. This method is more pertinent to situations in which there is a site which includes sub-sites within which responders may be active, but may include responders not active at any particular sub-site who still are active at the site and check in and out at an overall site RFID reader. An RFID scanning of a responder radio is performed before the second RFID scanning described at step 325 (FIG. 3). Thus, an RFID is obtained at step 405 before the second RFID is obtained, and is used at step 410 to associate a sub-site location with the responder identity when the RFID matches the RFID obtained at step 310 (FIG. 3). The associated sub-site location may then be shown along with the active responder's identity to users who are trying account for the responders. Using this method, a combined list of all active responders at any sub-sites of a site may be shown to the users, thereby helping the users know where to find an active responder. The information as to which sub-site an RFID is obtained at may be determined, for example, by information that is provided in the signal that includes the RFID, or by identifying a port at which the RFID signal is received, when separate ports are used for different RFID readers.

In situations in which RFID readers are located at two or more sub-sites within a site that are considered dangerous, then FIG. 3 and its description may alternatively be used to describe a method of accounting for responders at a sub-site by interpreting the "site" described with reference to FIG. 3 to be one of the two or more sub-sites. In situations in which there is an assembly site to which all responders are expected to report upon arrival before reporting to a sub-site and to report to after leaving the last sub-site, then the active responder database can be used to indicate whether responders are on active duty at a sub-site, or whether they are not on active duty at any sub-site and are therefore are available for deploying to a sub-site, thereby improving the management and accounting of responders.

Figure 5:
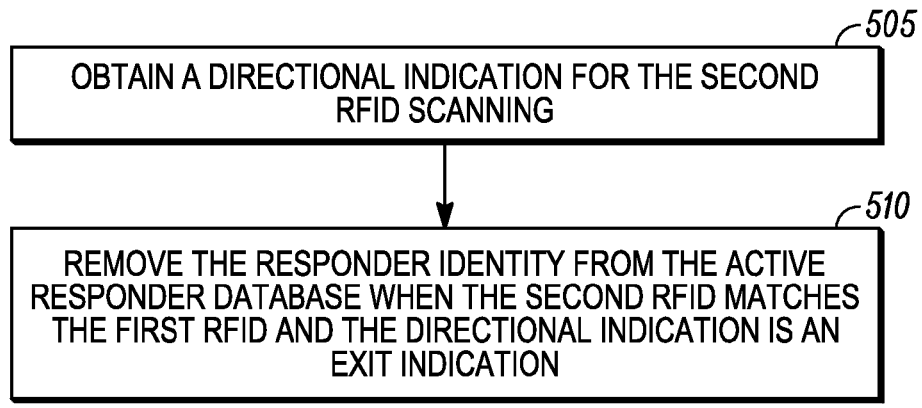
FIG. 5 is a flow chart that shows a method of accounting, in accordance with certain embodiments

Referring to FIG. 5, a flow chart shows some steps of a method 500 of accounting, in accordance with certain embodiments that are also consistent with the method of FIG. 3. At step 505, an exit indication is obtained for the second RFID described with reference to step 330 (FIG. 3). This indication may be obtained, for example, by an operator of the RFID reader that obtains the second RFID who enters that information, or by the responder who has the responder radio operating the RFID reader directly to provide the indication. This indication may then be sent to the computer in the signal that includes the second RFID. At the receipt of the directional indication, the computer removes the responder identity from the active responder database when the second RFID matches the first RFID and the directional indication is an exit indication. This method could be used for a site or a sub-site. Similarly, a directional indication could be obtained to indicate entry into a site (or sub-site). This additional information can be used to improve the accuracy of the accounting for responders, when techniques for capturing the information at the RFID reader are added to conventional RFID readers.

Referring to FIG. 6, a flow chart shows some steps of a method 600 of channel steering, in accordance with certain embodiments that are also consistent with the method of FIG. 3. In some embodiments according to FIG. 3, when the first RFID is received by the computer, the computer causes a command to be sent to the responder radio at step 605 that automatically channel steers the responder radio to a channel that is associated with the site. This improves the reliability of the responder having a proper channel on which to communicate the first the responder tries to do so after entering the site.

It will be appreciated that some embodiments described above may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Moreover, certain embodiments can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as "being close to" as understood by one of ordinary skill in the art, and where they used to describe numerically measurable items, the term is defined to mean within 15% unless otherwise stated. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for accounting for responders from a plurality of public safety agencies, including at least a firefighting agency and one other public safety agency, at a site, comprising:

clearing an active responder database associated with the site;

obtaining a first RFID from a portable responder radio that has been scanned by a mobile RFID reader when arriving in a vicinity of the site, the portable responder radio associated to one of the plurality of public safety agencies;

determining, by using the first RFID, a responder identity from a RFID database that associates each one of a plurality of responder identities to a corresponding responder radio RFID;

automatically adding at least one of the responder identity and the first RFID to the active responder database for the site;

initiating an acknowledgement to the portable responder radio that indicates that the responder identity has been added to the active responder database;

obtaining a third RFID before obtaining a second RFID, wherein the third RFID was obtained from an RFID scanning of a responder radio that was performed in a vicinity of a sub-site location; and associating the sub-site location with the responder identity when the third RFID matches the first RFID;

sending a command from a base station radio to the responder radio that automatically channel steers the radio to a channel that is associated with the sub-site location when the third RFID matches the first RFID;

obtaining the second RFID from the portable responder radio that has been scanned when leaving in the vicinity of the site; and automatically removing the at least one of the responder identity and the first RFID from the active responder database when the second RFID matches the first RFID.

2. The method according to claim 1, further comprising associating a first sub-site location with the responder identity in response to obtaining the first RFID.

3. The method according to claim 1, further comprising sending a command to the responder radio that automatically channel steers the responder radio to a channel that is associated with the site.

4. The method according to claim 1, further comprising obtaining a directional indication for the second RFID scanning;

removing the responder identity from the active responder database only when the second RFID matches the first RFID and the directional indication is an exit indication.

5. The method according to claim 1, further comprising initiating an acknowledgement to the responder radio that the responder identity has been deleted from the active responder database.

6. The method according to claim 1, wherein the at least one other public safety agency comprises one of police department and disease control agency.

7. The method according to claim 1, wherein the plurality of responder identities include identities of the at least one firefighting agency and the at least one other public safety agency.

8. A system for accounting for responders from a plurality of public safety agencies, including at least a firefighting agency and one other public safety agency, at a site, comprising:

a first mobile RFID reader that obtains a first RFID as a result of performing an RFID scanning of a portable responder radio, the portable responder radio associated to one of the plurality of public safety agencies, upon entering the site;

a second mobile RFID reader that obtains a second RFID as a result of performing an RFID scanning of the portable responder radio upon leaving the site; and a computer, coupled to the first and second mobile RFID readers, that clears an active responder database associated with the site;

determines, by using the first RFID, a responder identity from an RFID database that associates each one of a plurality of responder identities to a corresponding responder radio RFID;

automatically adds at least one of the responder identity and the first RFID to the active responder database for the site;

initiates an acknowledgement to the portable responder radio that the responder identity has been added to the active responder database;

initiates a command to the responder radio through a base station radio that automatically channel steers the responder radio to a channel that is associated with the site; and automatically removes the responder identity from the active responder database when the second RFID matches the first RFID.

9. The system according to claim 8, wherein the first and second mobile RFID readers are the same RFID reader.

10. The system according to claim 8, wherein the processor also initiates a command to the responder radio that automatically channel steers the responder radio to a channel that is associated with the site.

11. The system according to claim 8, further comprising a third RFID reader that obtains a third RFID as a result of performing a third RFID scanning of a responder radio before the second RFID scanning is performed, wherein the processor further associates a sub-site location with the responder identity when the third RFID matches the first RFID.

12. The system according to claim 11, wherein the processor also sends a command to the responder radio that automatically channel steers the radio to a channel that is associated with the sub-site location when the third RFID matches the first RFID.

13. The system according to claim 8, wherein the second RFID reader also obtains a directional indication for the second RFID scanning, and wherein the processor also removes the responder identity from the active responder database only when the second RFID matches the first RFID and the directional indication is an exit indication.

14. The system according to claim 8, wherein the at least one other public safety agency comprises one of police department and disease control agency.

15. The system according to claim 8, wherein the plurality of responder identities include identities of the at least one firefighting agency and the at least one other public safety agency.

16. An apparatus, for accounting for responders from a plurality of public safety agencies, including at least a firefighting agency and one other public safety agency, comprising:

an input that obtains a first and a second RFID;

an output that transmits an acknowledgement to a portable responder radio; and a processor that is controlled by instructions stored in memory to:

clear an active responder database associated with a site;

identify the first RFID as being a result of a first RFID scanning of the portable responder radio that was performed when entering the site by a mobile RFID reader in a vicinity of the site, the portable responder radio associated to one of the plurality of public safety agencies;

determine, by using the first RFID, a responder identity from an RFID database that associates each one of a plurality of responder identities to a corresponding responder radio RFID;

automatically add at least one of the responder identity and the first RFID to the active responder database for the site;

initiate the acknowledgement to the portable responder radio that indicates that the responder identity has been added to the active responder database;

initiate a command to the responder radio through a base station radio that automatically channel steers the responder radio to a channel that is associated with the site;

identify the second RFID as being a result of a second scanning of the portable responder radio when leaving the site, that was performed in the vicinity of the site; and automatically remove the responder identity from the active responder database when the second RFID matches the first RFID.

17. The apparatus of claim 16, wherein the at least one other public safety agency comprises one of police department and disease control agency.

18. The apparatus of claim 16, wherein the plurality of responder identities include identities of the at least one firefighting agency and the at least one other public safety agency.

* * * * *